3,471,303
EDIBLE COATING COMPOSITIONS AND
METHOD FOR COATING FOOD
Mokhtar M. Hamdy and Howard S. White, Minneapolis,
Minn., assignors to Archer-Daniels-Midland Company,
Minneapolis, Minn., a corporation of Delaware
No Drawing. Filed Mar. 7, 1966, Ser. No. 532,071
Int. Cl. C08b 19/00, 21/26; A23b 7/16
U.S. Cl. 99—166                                    14 Claims

ABSTRACT OF THE DISCLOSURE

A coating composition for foods comprising a homogeneous blend of (A) a fatty acid ester of a substantially linear polysaccharide having alpha-glucoside linkages, said ester containing at least two fatty acid radicals per glucose unit, said fatty acid having from 8–26 carbon atoms, and (B) a cellulose ether wherein the ether groups are methyl or ethyl, said ether containing from 2.1–2.7 ether groups per glucose unit.

---

The present invention relates to edible coating compositions, to methods for protecting food products, and to coated food products obtained with such coating compositions.

Although the coating of food products to protect such against oxidative degradation, mold attack, and moisture penetration is well-known, most coatings employed for these purposes are not edible and must be removed before the food can be consumed. A particular problem of food protection exists with respect to dehydrated foods such as obtained by the well-known freeze-drying processes. In the preparation of dehydrated food, it is not only desirable to protect the dehydrated foods against oxidative degradation, mold attack, and moisture penetration by applying an edible coating, but it is, furthermore, necessary that the coating does not significantly interfer with the rehydration of the dehydrated food, as well as with the taste of such food on rehydration, since the coating is not removed but is consumed. Furthermore, dehydrated foods tend to be brittle and to crumble readily when subjected to mechanical stress or shock. It would, therefore, be highly desirable to provide an edible coating composition which would also protect a dehydrated food product against fragmentation.

It is an object of the present invention to provide an edible coating composition.

It is another object of the present invention to provide an edible coating composition which protects food coated with such compositions against moisture penetration.

It is a further object of the present invention to provide an edible coating composition particularly adapted to the coating of dehydrated food.

It is still another object of the present invention to provide an edible coating composition which protects dehydrated food products against moisture penetration but permits the rehydration of such at elevated temperatures.

It is a still further object of the present invention to provide an edible coating composition which reduces fragmentation of brittle food products during storage and shipment.

Still other objects of the present invention are to provide a method of protecting food products to improve their storage life and to provide food products of improved storage life and transportability.

Other objects of the present invention will become apparent from the following description and the appended claims.

The edible coating composition of the present invention comprises a homogeneous blend of 25%–80% by weight of the total composition of an ester of a substantially linear polysaccharide having α-glucoside linkages and a fatty acid having from 8–26 carbon atoms, said ester containing at least two fatty acid radicals per glucose unit of said polysaccharide, and from 20%–75% by weight of the total composition of an edible cellulose ether.

Edible cellulose ethers have heretofore been employed in the coating of food products. These edible cellulose ethers have, however, the disadvantage of being poor moisture barriers and are extremely brittle and result in coatings which crack readily and, hence, are per se unsuitable as coatings for the protection of foods. It has heretofore been suggested to modify edible cellulose ethers by the addition of plasticizers to improve the toughness and coherence. Plasticizers which have been found to successfully accomplish these improvements, however, are either not considered to be edible, or if edible have been found to greatly reduce the already poor moisture barrier properties exhibited by edible cellulose ethers.

The present invention is based on the discovery that linear polysaccharide esters of fatty acids are capable of plasticizing both ethyl and methyl cellulose to result in tough and coherent coatings which adhere well to the food product. In addition to being edible, these polysaccharide fatty esters improve the moisture barrier properties of the edible cellulose ethers rather than decreasing such. The edible coating compositions of the present invention perform admirably when applied to foods by "curtain-coating" techniques, which constitute a particularly preferred method of applying food coatings involving the use of the coating material in the form of an extruded, molten sheet. Contrary to edible coating compositions heretofore developed, the coating compositions of the present invention have sufficient thermal stability to be useful in the "curtain-coating" equipment.

The edible cellulose ethers employed in the coating compositions of the present invention are commercially available cellulose ethers containing from 2.1 to 2.7 alkoxy groups per glucose unit. The alkoxy group is generally a methoxy or ethoxy group, although alkoxy groups having up to 4 carbon atoms can be employed. The preferred cellulose ethers are ethyl cellulose compositions having ethoxyl contents ranging from 45–50 weight percent, preferably between 48.0 and 49.5%. The viscosity of suitable cellulose ethers as determined in a solution of about 5% by weight of the cellulose ether in a solvent mixture consisting of about 80 parts by volume of toluene and 20 parts by volume of ethanol is generally in the range of about 6 to about 200 cps. (centipoises). The preferred cellulose ethers have viscosities of less than 50 cps.

The cellulose ethers are employed in combination with substantially linear polysaccharide esters of fatty acids to result in the coating compositions of the present invention. The polysaccharides employed are those which contain the α-glucoside linkages. Although low molecular weight polysaccharides, i.e., disaccharides and trisaccharides such as sucrose can be employed, the preferred linear polysaccharide in amylose, the substantially linear fraction of starch, which is separable from the highly branched fraction of starch, amylopectin, by known methods. The repeating glucose units of the amylose contain three hydroxyl groups which can be esterified by esterification methods heretofore employed for polyols and fatty acids. Amylose fatty esters which have desirable film and barrier-forming properties as well as other suitable fatty acid esters of polysaccharides are obtained when at least two of the available hydroxyl groups of the glucose units are esterified. Preferably, amylose fatty esters are employed in which between 80%–100% of the available hydroxyl groups of the amylose are esterified. The term "fatty acid" as employed herein is meant to define aliphatic carboxylic acids. Suitable fatty acids contain from 8–26 carbon atoms, and preferably from 10–18 carbon atoms. The fatty acid radical of the ester is preferably derived from saturated fatty acids in view of the greater stability to oxidation of such acids. Acids which are suitably reacted with the polysaccharides include stearic acid, lauric acid, palmitic acid, and myristic acid. Esters of unsaturated fatty acids such as oleic acid, however, are not excluded from the scope of the present invention. The amylose esters can contain more than one type of fatty acid radical and such esters are obtained when amylose is esterified with a mixture of acids. Similarly, mixtures of different amylose fatty esters can be employed. When esters of lower molecular weight linear polysaccharides such as sucrose are employed, dicarboxylic acids, alone or in combination with monocarboxylic fatty acids, can be employed.

The coating compositions are obtained by mixing from 25%–80% of the substantially linear polysaccharide fatty acid ester with 20%–75% of the edible cellulose ether, and preferably the edible coating compositions contain from 35%–50% of the fatty ester and from 50%–65% of the edible cellulose ethers; said percentages being based on the weight of the total composition. In order to achieve the superior mechanical film properties, as well as moisture barrier properties of the compositions of the present invention, it is essential that homogeneous blends of the two components be employed in the coating of food products. The term "homogeneous blends" as employed herein is intended to define a degree of blending such that in films prepared from the mixture the components cannot be distinguished by optical examination. Such homogeneous blends can be obtained by admixing the components dissolved in a common solvent such as toluene, or by mixing the two components in bulk at elevated temperatures, e.g., 90°–120° C., in blending equipment employed in the blending of resin compositions such as a rubber mill or a Banbury mixer. Since blending in bulk does not give rise immediately to a uniform blend, it is generally preferred to conduct such bulk blending in the absence of oxygen which would otherwise tend to degrade the composition. When using a common solvent such as toluene to prepare a uniform blend of the two components, the resulting composition can be employed directly in the coating of food products. If desired, however, the solvent can be evaporated and the resulting composition employed in hot melt-coating techniques.

The coating compositions of the present invention are applied to the food products by any of the various means which have heretofore been developed in the art. A particularly preferred method of applying coatings to food products comprises the extrusion of a molten sheet or curtain of the coating material which is passed over the food product to be coated. This curtain-coating technique and the equipment therefore is commercially available under the trade name "Eastoflow." In employing the coating composition of the present invention in this technique, care should be taken that the extruder, die, and extrudate temperatures do not cause degradation of the coating, which adversely affects the properties of the coating. Generally, these temperatures should not exceed 180° C., and preferably not exceeding 160° C. Sufficient melt flow of the coating composition to make it useful in this process can be accomplished by employing cellulose ethers and polysaccharide fatty esters of lower viscosities if it is found that a blend does not have sufficient melt flow at the upper temperatures indicated to make it readily extrudable. In addition to the described coating technique, the coating compositions are also useful in the more conventional methods of applying coatings to food products such as dipping, spraying, and brushing. Hot melts or solutions of the coating compositions can be employed in each instance. If solutions of the coating compositions are employed, it is necessary to dry the coated food product subsequent to the coating operation in order to assure the complete removal of solvent.

The thickness of the coating can be varied widely, although generally coating thicknesses which result in a weight increase of more than 30% of the food product coated are not preferred. The optimum coating thickness will vary with the particular food product coated, the degree of protection desired, and the storage environment involved. In general, the coating should have sufficient thickness to assure a continuous coating that gives the desired degree of protection. The thickness of the coating can be readily controlled by employing more dilute solutions to obtain thinner coatings or by repeating the coating application to obtain heavier coatings. In the curtain-coating technique, the thickness of the coating is also controllable by extruding thinner or thicker sheets of the coating material.

Although the coating compositions of the present invention are of particular utility in the coating of dehydrated food products such as dehydrated meats, vegetables, dairy products, and fruits to improve the storage life of such, they are also useful in the coating of frozen foods such as frozen meats and vegetables, as well as unmodified e.g., raw or fresh food products, to improve the storage life of such products. In view of the superior mechanical film properties exhibited by the compositions of the present invention, they are of further value in the coating of fragile food products in that they reduce breakage and spillage of such food products during storage and transportation. Dehydrated food products coated with the described compositions can be rehydrated by immersing such food products in water at elevated temperatures. The degree of rehydration is substantially the same as that obtained with uncoated food products.

The improvement in storage life of the products by the coating compositions of the present invention can be further enhanced with respect to the growth of micro- organisms, by the addition of a suitable preservative to the coating composition. Such preservatives include sorbic acid, potassium sorbate, methyl p-hydroxybenzoate, sodium benzoate, sodium propionate, and propyl p-hydroxybenzoate. Employing small concentrations of such preservatives results in a marked improvement in reducing or preventing the growth of microorganisms. Adequate protection against the growth of microorganisms is obtained if the concentration of the preservative in the coating constitutes about 0.01 to 0.2 percent by weight of the coated food product.

The present invention is further illustrated by the following examples, in which all units of quantity are by weight unless otherwise indicated.

EXAMPLE I

To a solution of amylose laurate containing 5.0 parts of amylose laurate having between 80%–90% of the available hydroxyl groups esterified in 150 parts of toluene, is added 100 parts of a toluene solution containing 8.0 parts of "Ethocel," a commercially available ethyl cellulose having an ethoxy content of 48%–49.5% and a viscosity at 20° C. of 50 cps. as measured by a 5% solution in a 60:40 volume mixture of toluene and ethanol. The resulting mixture is stirred until a uniform solution is obtained. A portion of this solution was drawn down to yield a film. On evaporation of the solvent, a film having a thickness of 0.5–0.6 mil is obtained which, despite being very thin, is tough and flexible. The water permeability of the film is less than half of that of a film of comparable thickness made by drawing down a toluene solution of ethyl cellulose alone.

EXAMPLE II

The procedure of Example I is repeated employing amylose myristate instead of the laurate. Substantially the same results are obtained.

EXAMPLE III

A coating solution is prepared by dissolving 2.5 parts of amylose laurate and 7.5 parts of ethyl cellulose in 90.0 parts of "Ethocel" in trichloromethane. Freeze-dried strawberries are suspended in an air stream at a temperature of about 127° F. The suspended strawberries are continuously sprayed at a rate of 60 cc./minutes. When removed from the spraying zone, the air-suspended strawberries dry almost instantly, leaving a continuous coating of the strawberries. The coating increases the weight of the food product by about 20%. The strawberries are completely encapsulated by the coating. The coated product can be rehydrated to substantially the extent of rehydration of the unmodified freeze-dried product.

The foregoing examples have illustrated the formation of the coating compositions of the present invention and the application of such to food products. Employing the described procedures, similar results are obtained with other fatty esters of amylose and with fatty esters of other polysaccharides such as sucrose stearate and sucrose palmitate, or mixtures thereof. Methyl cellulose can be employed in place of ethyl cellulose in the specifically illustrated compositions. Other suitable coating techniques will be apparent to those skilled in the art, and it is intended to include such within the scope of the invention described. The utility of the coating compositions of the present invention in the protection of food products is self-evident from the foregoing description.

The coating compositions of the present invention are particularly useful as moisture barriers for food products. Although they also reduce oxidative degradation in food products, better coating materials are known for preventing oxidative degradation; in particular, protein coatings obtained by applying protein dispersions are outstanding. Food products can be protected against both oxidative degradation and moisture penetration by applying, in addition to the coating composition of the present invention, a protein coating. The protein coating can be applied before or after the described coating composition is applied, depending on the particular food (e.g., in the case of freeze-dried foods, the protein coating is applied after the coating of this invention). In effect, therefore, it is feasible to protect food products with an edible food coating laminate against moisture as well as oxidative degradation.

It is to be understood that the foregoing detailed description of the present invention is given merely by way of illustration and that it is not intended to limit the scope of the invention, except as defined in the appended claims.

What is claimed is:

1. A coating composition comprising a homogeneous blend of 25%–80% by weight of the total composition of an ester of a fatty acid having from 8–26 carbon atoms and a substantially linear polysaccharide having α-glucoside linkages, said ester containing at least two fatty acid radicals per glucose unit, and 75%–20% by weight of the total composition of a cellulose ether wherein the ether groups are methyl or ethyl, said cellulose ether containing from 2.1–2.7 ether groups per glucose unit.

2. The coating composition of claim 1, wherein the polysaccharide is amylose and the cellulose ether is ethyl cellulose.

3. The coating composition of claim 2, wherein from 35%–50% of the fatty acid amylose ester and from 65%–50% of the ethyl cellulose are employed, said ethyl cellulose having an ethoxy content of 45%–50%.

4. The coating composition of claim 3, wherein the fatty acid is lauric acid.

5. The coating composition of claim 3, wherein the fatty acid is myristic acid.

6. The coating composition of claim 3, wherein the ethoxy content of the cellulose is from 47%–49%.

7. The method of protecting food products with the coating composition of claim 1, which comprises forming a homogeneus blend of 25%–80% by weight of the total composition of an ester of a fatty acid having from 8–26 carbon atoms and a substantially linear polysaccharide having α-glucoside linkages, said ester containing at least two fatty acid radicals per glucose unit and 75%–20% by weight of the total composition of a cellulose ether wherein the ether groups are methyl or ethyl, said cellulose ether containing from 2.1–2.7 ether groups per glucose unit, by admixing said components in solution in a common solvent and thereafter coating a food product with said homogeneous blend.

8. The method of claim 7, wherein the polysaccharide is amylose.

9. The method of claim 8, wherein the cellulose ether is ethyl cellulose.

10. The method of claim 7, wherein the solvent is toluene.

11. A food product coated with the composition of claim 1.

12. A dehydrated food product coated with the composition of claim 1.

13. A food product coated with the composition of claim 3.

14. A dehydrated food product coated with the composition of claim 3.

References Cited

UNITED STATES PATENTS

| | | | |
|---|---|---|---|
| 2,665,992 | 9/1962 | Naps | 99—167 |
| 2,868,656 | 1/1959 | Patten et al. | 99—166 |

FOREIGN PATENTS

| | | |
|---|---|---|
| 234,282 | 6/1959 | Australia. |

OTHER REFERENCES

A. T. Gros and R. O. Feuge: "Properties of the Fatty Acid Esters of Amylose," from The Journal of the American Oil Chemists's Society, January 1962, pp. 19–24.

A. LOUIS MONACELL, Primary Examiner

W. C. LAWTON, Assistant Examiner

U.S. Cl. X.R.

99—168, 169; 106—178 191; 117—166, 167